US010161316B2

(12) United States Patent
Kupratis et al.

(10) Patent No.: US 10,161,316 B2
(45) Date of Patent: Dec. 25, 2018

(54) ENGINE BYPASS VALVE

(71) Applicant: United Technologies Corporation, Hartford, CT (US)

(72) Inventors: Daniel B. Kupratis, Wallingford, CT (US); Christopher J. Hanlon, Sturbridge, MA (US); Walter A. Ledwith, Jr., Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 218 days.

(21) Appl. No.: 14/685,166

(22) Filed: Apr. 13, 2015

(65) Prior Publication Data

US 2016/0298550 A1    Oct. 13, 2016

(51) Int. Cl.
| | | |
|---|---|---|
| *F02K 3/075* | (2006.01) | |
| *F02K 3/077* | (2006.01) | |
| *F02C 9/18* | (2006.01) | |
| *F02C 3/13* | (2006.01) | |

(52) U.S. Cl.
CPC ............... *F02C 9/18* (2013.01); *F02C 3/13* (2013.01); *F02K 3/075* (2013.01); *F02K 3/077* (2013.01); *F05D 2220/323* (2013.01); *F05D 2260/213* (2013.01); *Y02T 50/675* (2013.01)

(58) Field of Classification Search
CPC . F02C 9/18; F02K 3/075; F02K 3/077; F01D 17/18
See application file for complete search history.

(56) References Cited

U.S. PATENT DOCUMENTS

| | | | | |
|---|---|---|---|---|
| 3,938,328 A | * | 2/1976 | Klees | F02K 3/04 60/224 |
| 4,064,692 A | * | 12/1977 | Johnson | F02K 3/075 60/262 |
| 4,068,471 A | | 1/1978 | Simmons | |
| 4,285,194 A | * | 8/1981 | Nash | F02K 1/822 60/262 |
| 4,813,229 A | * | 3/1989 | Simmons | F02C 7/18 60/204 |
| 4,958,489 A | * | 9/1990 | Simmons | F02C 7/18 60/226.3 |
| 4,961,312 A | * | 10/1990 | Simmons | F02C 7/18 60/204 |
| 5,155,993 A | * | 10/1992 | Baughman | F04D 27/023 60/226.1 |

(Continued)

OTHER PUBLICATIONS

Bernie MacIsaac, "Gas Turbine Propulsion Systems", Wiley Aerospace Series, John Wiley & Sons, Ltd., 2011.

(Continued)

*Primary Examiner* — Todd E Manahan
*Assistant Examiner* — Rene Ford
(74) *Attorney, Agent, or Firm* — O'Shea Getz P.C.

(57) ABSTRACT

Aspects of the disclosure are directed to an engine of an aircraft. The engine may include a first fan configured to output a first air flow, a second fan configured to receive a first portion of the first air flow and output a second air flow, a core configured to receive a first portion of the second air flow and generate a first stream, and at least one valve configured to assume one of at least three states in association with a generation of a second stream and a third stream based on at least one of the first air flow and the second air flow.

19 Claims, 9 Drawing Sheets

(56) References Cited

U.S. PATENT DOCUMENTS

| | | | | |
|---|---|---|---|---|
| 5,182,905 | A * | 2/1993 | Stransky | F02C 7/18 60/204 |
| 5,261,228 | A * | 11/1993 | Shuba | F01D 17/105 60/226.3 |
| 5,269,135 | A | 12/1993 | Vermejan | |
| 5,680,754 | A * | 10/1997 | Giffin | F02K 3/02 60/226.1 |
| 5,809,772 | A | 9/1998 | Giffin | |
| 5,867,980 | A * | 2/1999 | Bartos | F02K 7/16 60/226.1 |
| 6,070,407 | A * | 6/2000 | Newton | F02K 3/075 239/265.19 |
| 6,434,943 | B1 | 8/2002 | Garris | |
| 6,477,829 | B1 | 11/2002 | Hunter | |
| 6,662,546 | B1 * | 12/2003 | Giffin, III | F02C 7/04 342/4 |
| 7,730,714 | B2 | 6/2010 | Wood | |
| 7,882,694 | B2 | 2/2011 | Suciu | |
| 8,480,350 | B2 | 7/2013 | Winter | |
| 8,915,700 | B2 | 12/2014 | Kupratis | |
| 2005/0008482 | A1 * | 1/2005 | Allford | F01D 17/162 415/175 |
| 2005/0047942 | A1 * | 3/2005 | Grffin, III | F02K 3/072 417/423.1 |
| 2005/0072158 | A1 * | 4/2005 | Christopherson | F01D 17/105 60/761 |
| 2008/0112798 | A1 * | 5/2008 | Seitzer | F01D 11/24 415/144 |
| 2011/0167791 | A1 * | 7/2011 | Johnson | F01D 17/162 60/226.3 |
| 2012/0144842 | A1 * | 6/2012 | Snyder | F01D 25/12 60/785 |
| 2013/0098067 | A1 | 4/2013 | Suciu et al. | |
| 2013/0104521 | A1 | 5/2013 | Kupratis | |
| 2014/0260180 | A1 | 9/2014 | Kupratis et al. | |
| 2016/0208692 | A1 * | 7/2016 | Hanlon | F02K 3/075 |
| 2016/0298550 | A1 * | 10/2016 | Kupratis | F02C 3/13 |

OTHER PUBLICATIONS

Cale H. Zeune, "Enabling Speed Agility for the Air Force", 48th AIAA Aerospace Sciences Meeting, AIAA 2010-349, Orlando, Florida, Jan. 4-7, 2010.

EP search report for EP16165134.4 dated Sep. 14, 2016.

* cited by examiner

ENGINE BYPASS VALVE

BACKGROUND

In association with the operation of an engine, such as an engine that may be used to power an aircraft, the engine may generate or be associated with one or more streams. The streams may interact with one another, potentially on the basis of a state or position associated with of one or more valves. The valves may introduce a pressure loss in the engine, and such pressure loss has an impact on performance and efficiency. In particular, this pressure loss has an impact on the streams described above.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to an engine of an aircraft, comprising: a first fan configured to output a first air flow, a second fan configured to receive a first portion of the first air flow and output a second air flow, a core configured to receive a first portion of the second air flow and generate a first stream, and at least one valve configured to assume one of at least three states in association with a generation of a second stream and a third stream based on at least one of the first air flow and the second air flow. In some embodiments, when the at least one valve is in a first of the at least three states the second stream and the third stream are generated based on a second portion of the second air flow. In some embodiments, when the at least one valve is in a second of the at least three states the second stream is generated based on the second portion of the second air flow and the third stream is generated based on a second portion of the first air flow. In some embodiments, when the at least one valve is in a third of the at least three states the second stream is generated based on a mixture of the second portion of the first air flow and the second portion of the second air flow. In some embodiments, when the at least one valve is in the third of the at least three states the third stream is generated based on the second portion of the first air flow. In some embodiments, the second portion of the first air flow bypasses the second fan. In some embodiments, the engine further comprises a heat exchanger, were the third stream is based on an output of the heat exchanger. In some embodiments, the first fan includes a plurality of stages. In some embodiments, the core includes a turbine arranged as a plurality of sections, and a first of the turbine sections is configured to drive the first fan, and a second of the turbine sections is configured to drive the second fan. In some embodiments, the first fan is located forward of the second fan with respect to an inlet air flow received by the first fan, and the second fan is located forward of the core with respect to the inlet air flow. In some embodiments, the engine further comprises a nozzle configured to output a mixture of the first stream and a portion of the second stream. In some embodiments, the engine further comprises at least one nozzle configured to output at least the third stream. In some embodiments, the engine further comprises a duct located radially outboard of the third stream. In some embodiments, the duct is configured to convey a second portion of the second air flow when the at least one valve is in a first of the at least three states. In some embodiments, the duct is configured to convey a second portion of the first air flow when the at least one valve is in a second of the at least three states. In some embodiments, the duct is configured to convey the second portion of the second air flow when the at least one valve is in a third of the at least three states. In some embodiments, the third stream is discontinuous in nature in the engine forward-to-aft, and the at least one valve includes a plurality of valves, and a first of the valves is located at a first location and a second of the valves is located at a second location, and the first and second locations are substantially symmetrical with respect to an axial centerline of the engine.

Aspects of the disclosure are directed to an engine of an aircraft, comprising: a first fan configured to output a first air flow, a second fan configured to receive a first portion of the first air flow and output a second air flow, a core configured to receive a first portion of the second air flow and generate a first stream, and at least one valve configured to assume one of at least three states in association with a generation of a second stream and a third stream, where the second stream is based on a second portion of the second air flow. In some embodiments, the second fan comprises a first inducer stage and a second inducer stage. In some embodiments, the first inducer stage comprises a first set of vanes and a first set of blades, and the second inducer stages comprises a second set of vanes and a second set of blades, and the first set of vanes and the second set of vanes are part of a core stator structure, and the first set of blades and the second set of blades are part of at least one rotor.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
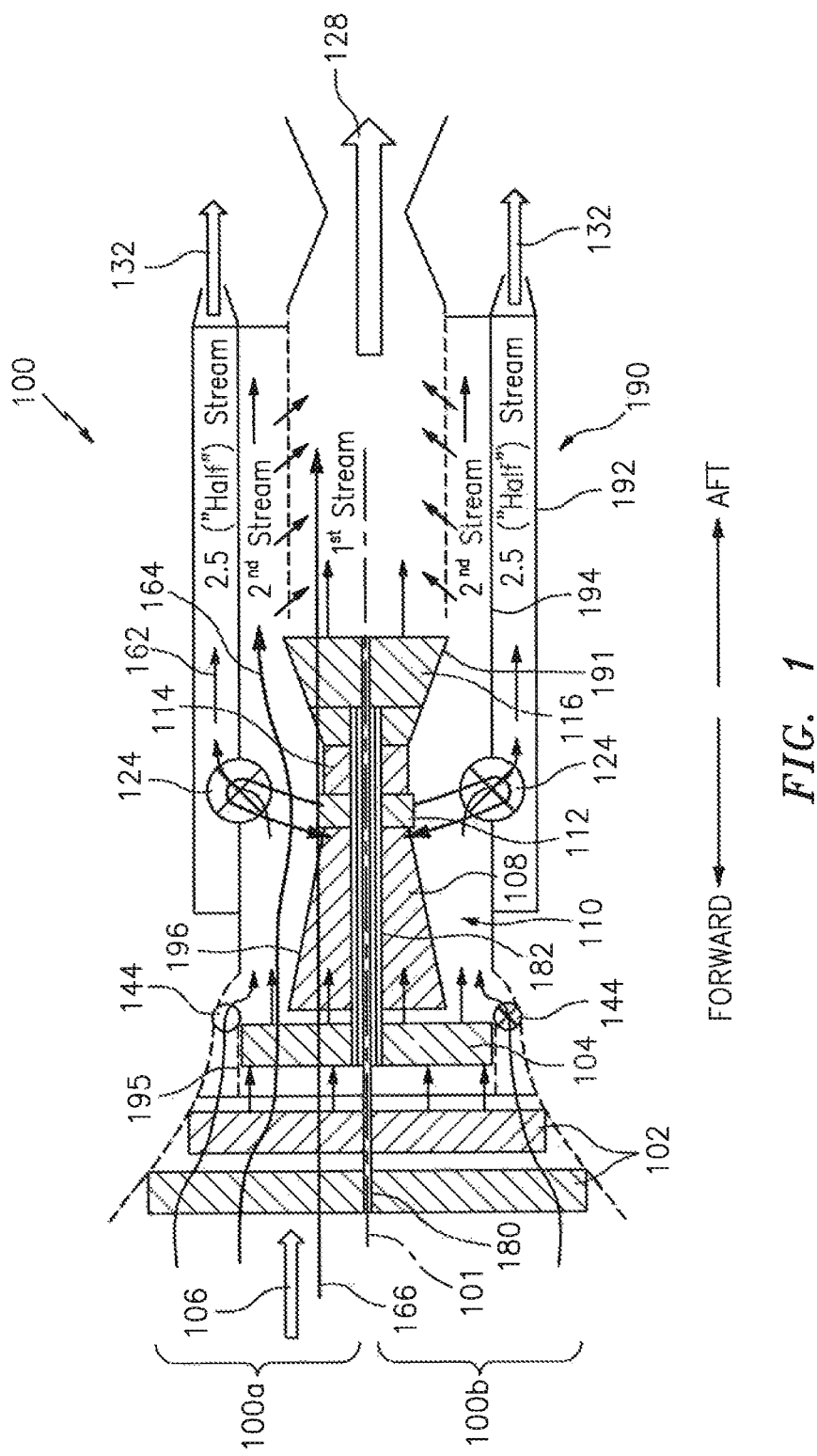
FIG. 1 is a side cutaway illustration of an engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for controlling and regulating one or more streams associated with the operation of an engine. Such control and regulation may be provided by one or more valves. The valve(s) may be associated with one or more fans or fan stages and/or one or more turbines or turbine sections. The valve(s) may be configured to assume multiple states/positions. In some embodiments, the valve(s) may be configured to assume at least three states.

Referring to FIG. 1, an engine 100 is shown. The engine 100 is shown as extending in a forward and aft direction about an axial centerline 101. Aside from differences beyond the scope of this disclosure, the engine 100 may be substantially symmetrical about the centerline 101, such that the engine 100 can be conceptualized as having a first, top portion 100a above the centerline 101 and a second, bottom portion 100b below the centerline 101 as shown in FIG. 1.

The engine 100 includes a two-stage fan 102 and a one-stage fan 104. The fan 104 receives a portion of the air flow output by the fan 102. The fans 102 and 104 provide a portion of an inlet air flow 106 to one or more compressors 108. The output air/fluid of the compressor 108 is provided to a diffuser 112 that provides for a conversion between velocity and pressure. The output of the diffuser 112 is provided to a combustor 114, which provides for combustion of a mixture of fuel and air. The turbine 116 converts the gaseous energy of the air/burned fuel mixture out of the combustor into mechanical energy to drive the fans 102 and 104 and the compressor 108. The compressor 108, the diffuser 112, the combustor 114, and the turbine 116 may form a core of the engine 110.

The turbine 116 may include multiple sections, such that a first of the sections drives the fan 102 and a second of the sections drives the fan 104, via a dual-spool configuration. The first turbine section may be referred to as a low-pressure turbine section and the second turbine section may be referred to as a high-pressure turbine section.

The engine 100 generally includes a low spool 180 and a high spool 182 that rotate about the engine central longitudinal axis 101 relative to an engine case structure 190 (illustrated schematically). Other architectures, such as three-spool architectures, will also benefit herefrom. The engine case structure 190 generally includes an outer case structure 192, an intermediate fan duct case structure 194, an intermediate case structure 195, and an inner case structure 196 that form a flowpath for the core stream 166, a flow path for second stream 164, and a flow path for a third stream 162 (all illustrated schematically by flow arrows). The intermediate case structure 195 is generally between the inner diameter of the fan section 102 and the compressor section 110 to facilitate direction of airflow from the fan section 102 as well as provide a ground for the spools 180, 182. The engine case structure 190 may also include the turbine exhaust case section 191 that typically supports a portion of the weight of the low spool 180, in addition to bearing its own weight and the aerodynamic loads affecting thereon by the exhaust gases. It should be appreciated that various structures, individual, or collectively, may form the case structures 190 to essentially define an exoskeleton that supports the spools 180, 182 for rotation therein.

Although the engine 100 is depicted as an augmented low bypass turbofan, it should be appreciated that the concepts described herein are applicable to other gas turbine engines including non-augmented engines, geared architecture engines, direct drive turbofans, turbojet, turboshaft, multi-stream variable cycle, and other engine architectures with a nozzle system.

Also shown in FIG. 1 are multiple streams. A first or primary stream corresponds to the output/exhaust of the turbine 116, or more generally, the core. A second stream corresponds to a portion of the output of the fan 104, as potentially mixed with a portion of the output of the fan 102. A third stream (labeled as 2.5 "Half" stream in FIG. 1 to denote its discontinuous nature in the engine 100, forward-to-aft) incorporates lower temperature air as provided by a cooling air valve/heat exchanger 124, potentially in combination with a portion of the second stream.

The valve/heat exchanger 124 performs a heat exchange relationship with respect to air provided by the compressor 108, as notionally derived from a housing of the diffuser 112. High temperature, high pressure air from the diffuser 112 is provided as the hot-stream input to the valve/heat exchanger 124. The third stream (labeled as 2.5 "Half" stream in FIG. 1 provides the cold-stream input to the valve/heat exchanger 124.

The hot-stream output from the valve/heat exchanger 124 is returned to the compressor 108; the hot-stream returned to compressor 108 is substantially cooler than the hot-stream input to the valve/heat exchanger 124 and is at a similar pressure as the hot-stream input to the valve/heat exchanger 124.

The cold-stream output from the valve/heat exchanger 124 is included in the third stream as described above; this cold-stream output from the valve/heat exchanger 124 is at a higher temperature than the input to the cold-stream input to the valve/heat exchanger 124 and is at a substantially lower pressure than the cold-stream input to the valve/heat exchanger 124 in order to promote heat transfer efficiency in the operation of the valve/heat exchanger 124.

As shown in FIG. 1, a portion of the second stream may combine with the first stream and be output/exhausted in conjunction with a first stream nozzle or mixed flow nozzle 128. The third stream may be output/exhausted in conjunction with a third stream nozzle 132.

Associated with the fans 102 and 104 are one or more fan bypass valves 144. The valves 144 may be opened to promote mixing between a portion of the output of the fan 102 and a portion of the output of the fan 104. Conversely, the valves 144 may be closed to prevent such mixing from occurring. The valves 144 introduce a pressure loss in the engine 100. This pressure loss has an impact on the streams described above; in particular, this pressure loss imposes limits on what can be done in conjunction with the third stream.

In view of the aforementioned pressure loss, alternative configurations for an engine and a valve may be provided in accordance with aspects of this disclosure. Illustrative configurations for such engines and valves are described in further detail below.

Figure 2A:
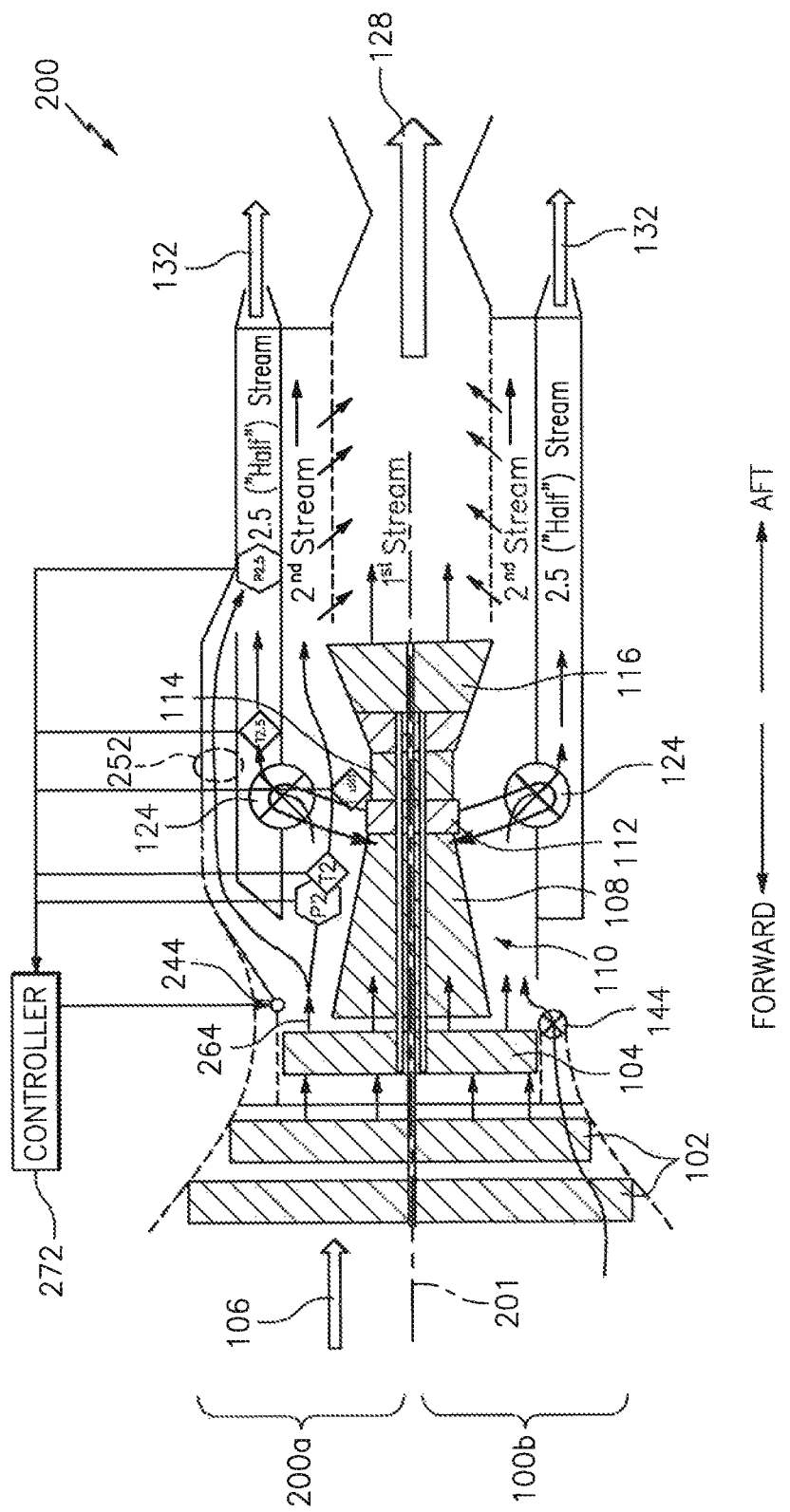
FIGS. 2A-2C illustrate an engine incorporating at least one valve that assumes one of at least three states in generating a plurality of streams.
Figure 2B:
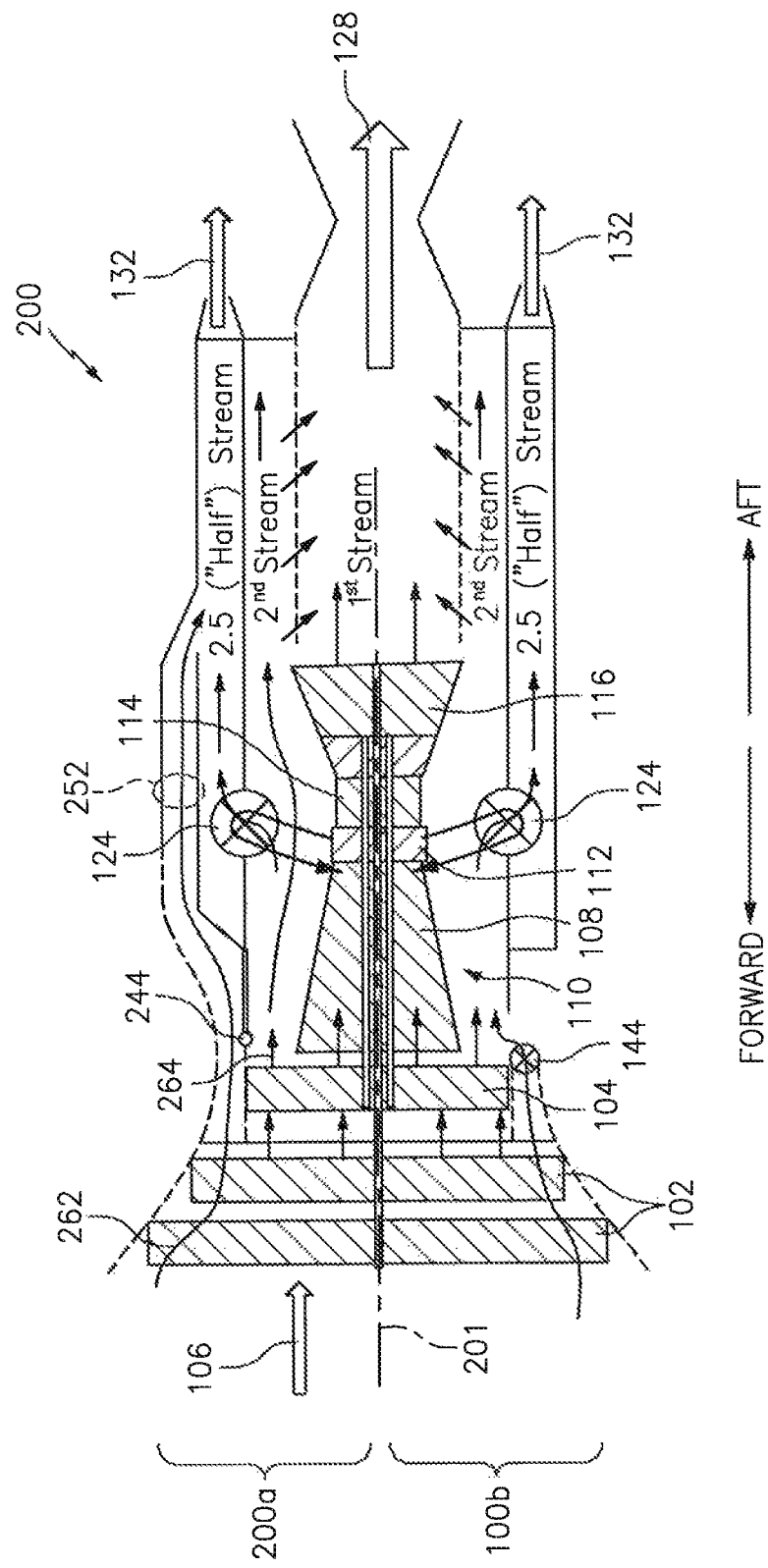
Figure 2C:
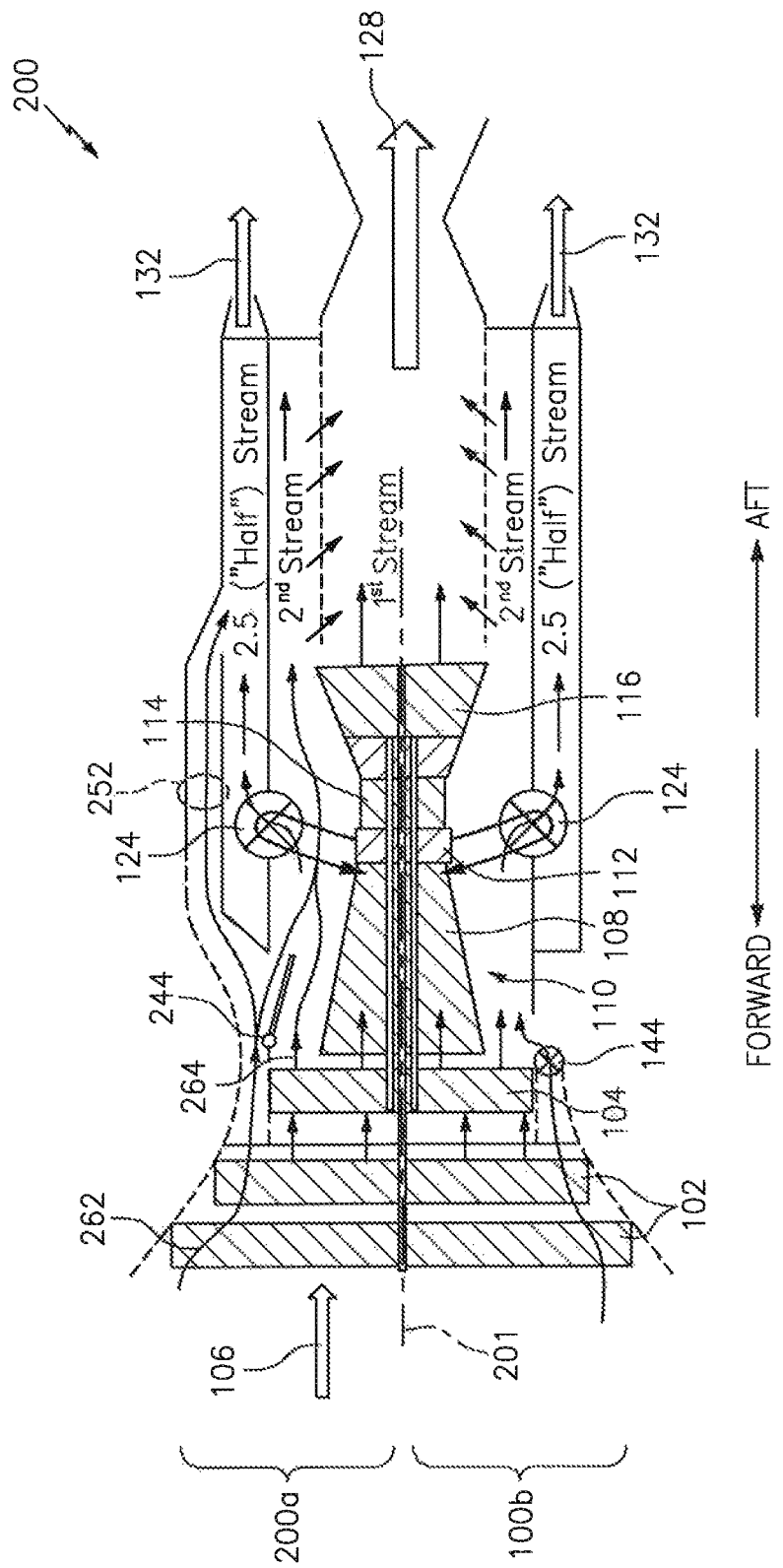

Referring to FIGS. 2A-2C, an engine 200 is shown. The engine 200 includes many of the same (types of) components, devices, streams, and flows as described above in connection with the engine 100 of FIG. 1, and so, a complete re-description is omitted for the sake of brevity. A low pressure fan stream is denoted by reference character 262 and a high pressure fan stream is denoted by reference character 264.

For purposes of illustration and ease of comparison, the portion 100b of the engine 100 is replicated below an axial centerline 201 in FIGS. 2A-2C; the portion of the engine 200 above the axial centerline 201 is denoted as reference character 200a. In some embodiments, the portion 200a may be substantially replicated below the centerline 201, in lieu of using the portion 100b. The description below in connection with FIGS. 2A-2C is principally focused on, or applies to, the portion 200a.

In terms of differences between the engines 100 and 200, the engine 200 is shown as including a valve 244 and an auxiliary duct 252. The auxiliary duct 252 may be configured to bypass a portion of the third stream (where, again, the third stream is labeled as 2.5 or "Half" stream). The auxiliary duct 252 may be located radially outboard of the third stream.

The valve 244, which may be referred to as a turbofan engine bypass valve, may be configured to assume multiple states/positions. For example, the valve 244 may be configured to assume one of three states. FIG. 2A shows the valve 244 in a first of the states, FIG. 2B shows the valve 244 in a second of the states, and FIG. 2C shows the valve 244 in a third of the states.

When the valve 244 is in the first state as shown in FIG. 2A, the second stream and the third stream may be formed/generated from (a portion of) the air flow as provided by the fan 104. In other words, the air flows that are used as the inputs to the second and third streams may have been subjected to conditioning/processing by the fan 104. FIG. 2A may be marked by a large flow through the third stream and a small pressure drop on a cold side of the valve/heat exchanger 124.

When the valve 244 is in the second state as shown in FIG. 2B, the second stream may be generated by an air flow that has been subjected to conditioning/processing by the fan 104. Conversely, at least a portion of the air flow that forms the third stream may be based on the output taken directly from the fan 102 (e.g., not subjected to conditioning/processing by the fan 104, such that the fan 104 is bypassed). The portion of the output of the fan 102 that is not subjected to conditioning/processing by the fan 104 may flow through the third stream only in FIG. 2B. FIG. 2B may be marked by a large flow through the third stream and a nominal pressure drop on a cold side of the valve/heat exchanger 124.

When the valve 244 is in the third state as shown in FIG. 2C, the second stream may be generated by a first air flow as provided directly by the fan 102 and a second air flow as provided by the fan 104. In other words, in FIG. 2C the second stream may be formed based on a partial conditioning/processing provided by the fan 104. Similar to FIG. 2B, in FIG. 2C at least a portion of the air flow that forms the third stream may be based on the output taken directly from the fan 102 (e.g., not subjected to conditioning/processing by the fan 104). The mixing provided in FIG. 2C may provide for an exceptionally cool, low temperature heat sink with respect to the valve/heat exchanger 124.

Figure 3A:
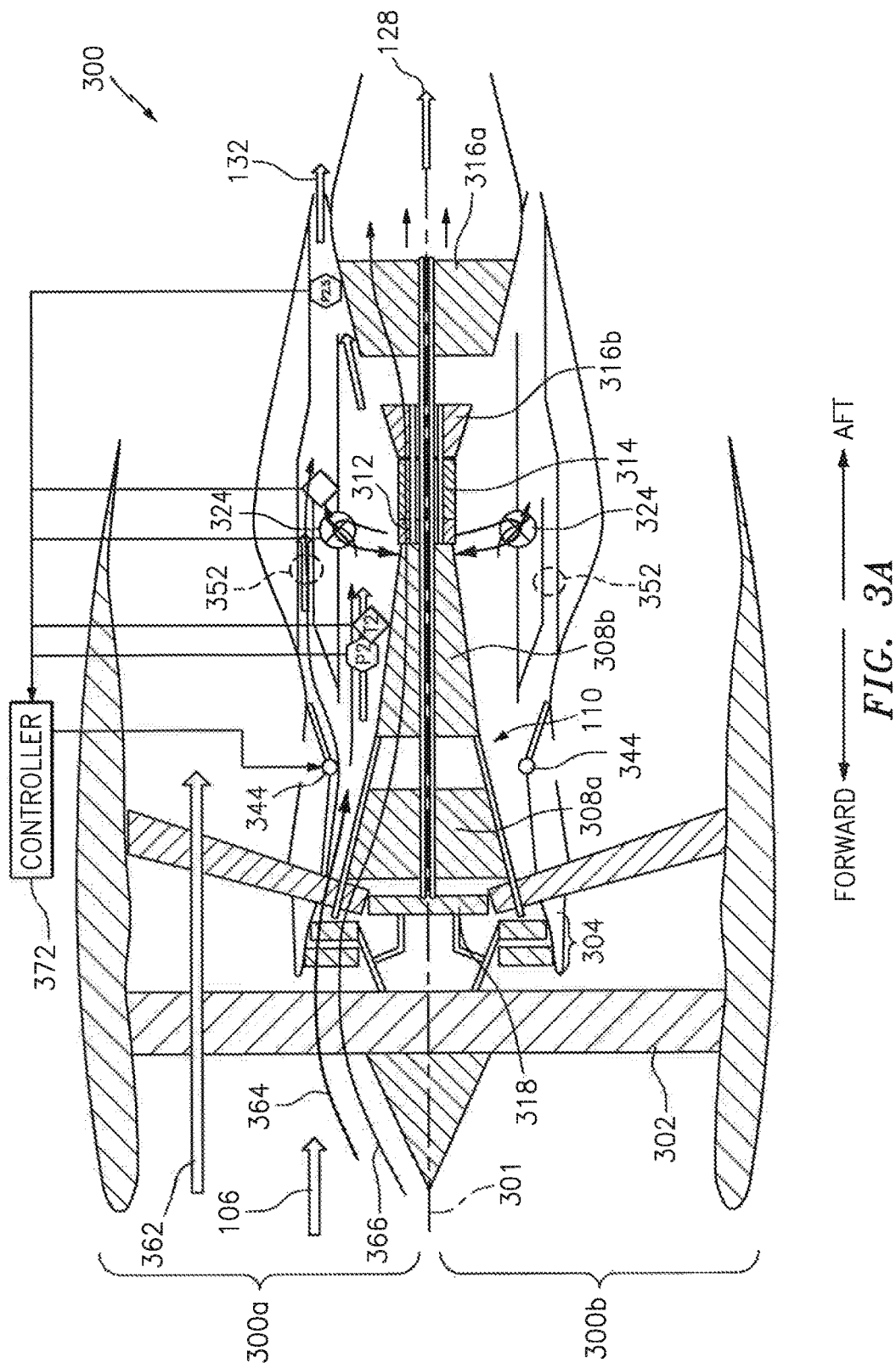
FIGS. 3A-3C illustrate an engine incorporating valves that each assume one of at least three states in generating a plurality of streams.
Figure 3B:
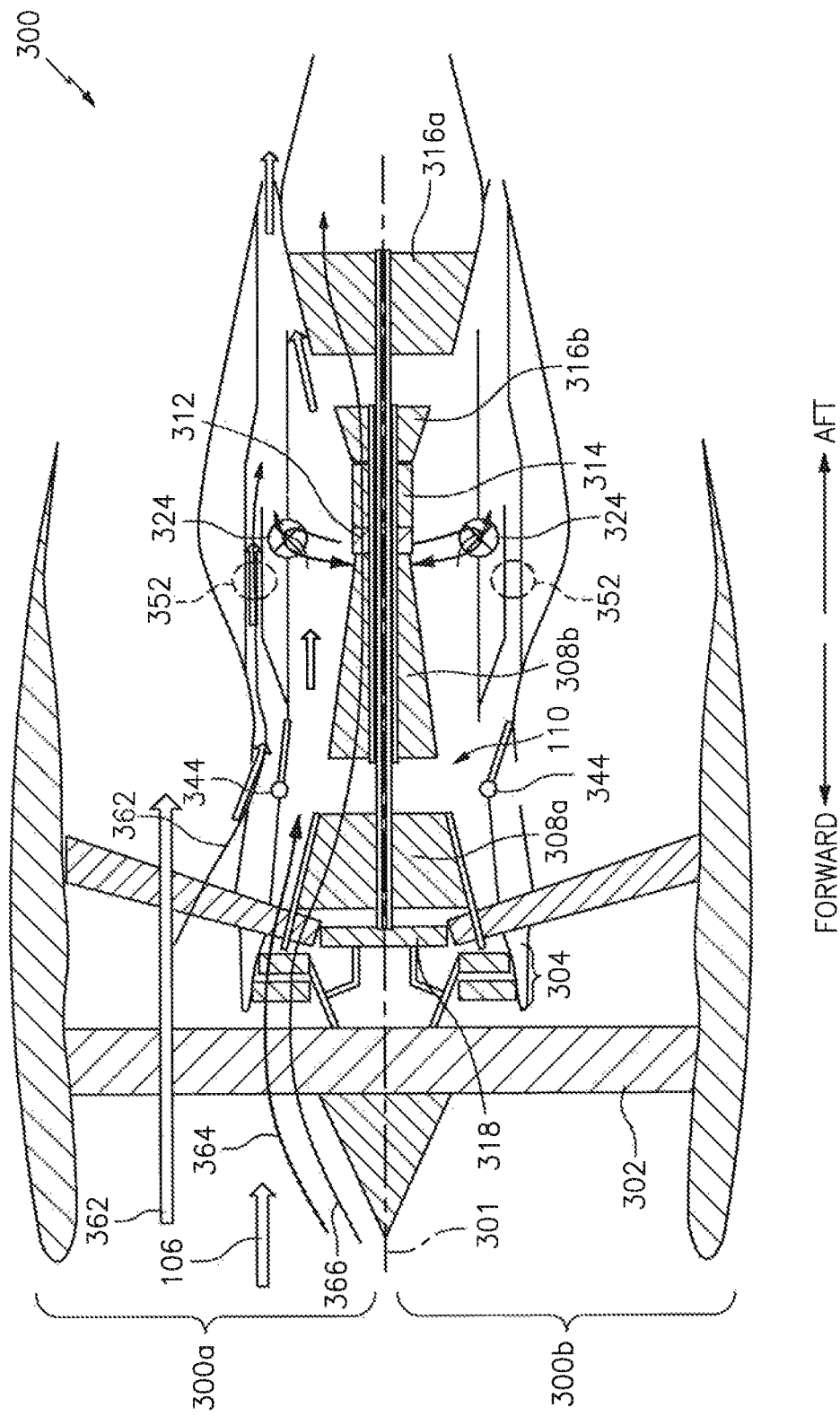
Figure 3C:
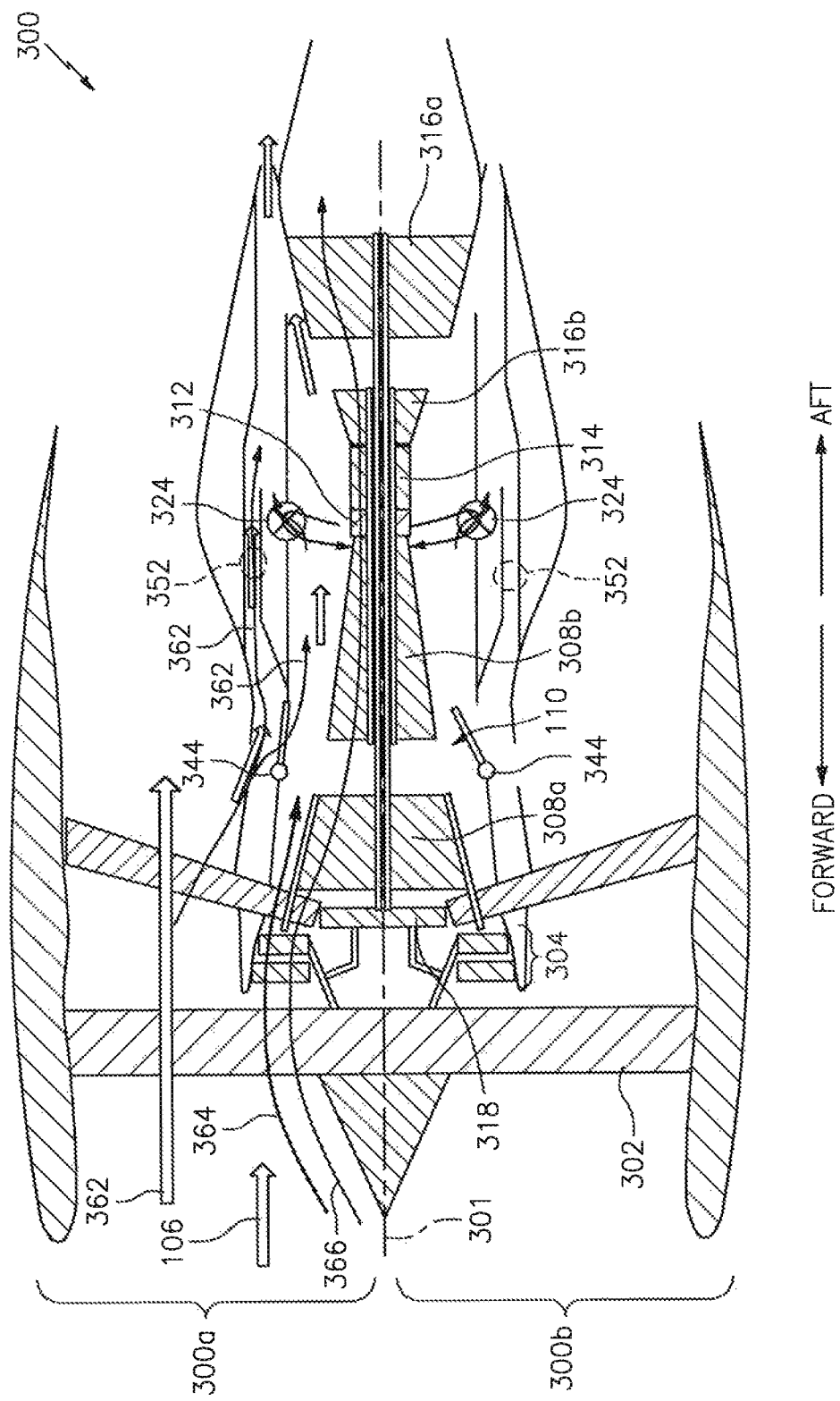

Referring now to FIGS. 3A-3C, an engine 300 in accordance with aspects of the disclosure is shown. The engine 300 is shown as being substantially symmetrical about an axial centerline 301, such that the engine 300 may be conceptualized as having a first, top portion 300a above the centerline 301 and a second, bottom portion 300b below the centerline 301.

The engine 300 may include a first fan or fan stage 302 and a second fan or fan stage 304. A low pressure fan stream is denoted by reference character 362 and a high pressure fan stream is denoted by reference character 364. Also shown traversing the fan stages 302 and 304 is a core flow 366 that flows through the core 110.

The first fan 302 and the second fan 304 may be driven by a low-pressure turbine (LPT) 316a through a speed reduction device 318. One type of speed reduction device is a planetary epicyclical gear set. A compressor is shown as being provided in at least two sections, e.g., a low-pressure compressor (LPC) 308a and a high-pressure compressor (HPC) 308b. The low-pressure compressor (LPC) 308a may be driven directly by a low-pressure turbine (LPT) 316a. The high-pressure compressor (HPC) 308b may be driven directly by a high-pressure turbine (HPT) 316b.

The above described components may be included in various turbine engines other than the one described above. The turbine engine component, for example, may be included in a geared turbine engine where a gear train connects one or more shafts to one or more rotors in a fan section, a compressor section and/or any other engine section. Alternatively, the turbine engine component may be included in a turbine engine configured without a gear train. The turbine engine component may be included in a geared or non-geared turbine engine configured with a single spool, with two spools, or with more than two spools. The present disclosure therefore is not limited to any particular types of compressors or turbines that may form a core 110 of the engine.

The compressor may be associated with a diffuser 312, the output of which may be provided to combustor 314. The output of the combustor 314 may be provided to the turbine formed by the sections 316b and 316a. A cooling air valve/heat exchanger 324 may be arranged with respect to the compressor (e.g., the HPC 308b)/diffuser 312 and the third stream (where, again, the third stream is labeled as 2.5 or "Half" stream) in a manner similar to that described above in connection with FIG. 1.

The engine 300 is shown as including auxiliary ducts 352. The auxiliary ducts 352 may be similar to the auxiliary duct 252 described above.

The engine 300 is shown as including valves 344. The valves 344 may function in a manner similar to the valves 244 described above in connection with FIGS. 2A-2C. For example, the valves 344 may be configured to assume one of three states, e.g., a first state in FIG. 3A, a second state in FIG. 3B, and a third state in FIG. 3C. The valves 344 may be symmetrically located relative to the centerline 301.

When the valves 344 are in the first state as shown in FIG. 3A, there might not be any mixing between the output of the fan 304 and a bypass flow formed from the direct output of the fan 302. In FIG. 3A, the second stream and the third stream may be formed from the air flow as provided by the fan 304.

When the valves 344 are in the second state as shown in FIG. 3B, the second stream may be formed by an air flow that has been subjected to conditioning/processing by the fan 304. Conversely, at least a portion of the air flow that forms the third stream may be based on the output taken directly from the fan 302 (e.g., not subjected to conditioning/processing by the fan 304). The portion of the output of the fan 302 that is not subjected to conditioning/processing by the fan 304 may flow through the third stream only in FIG. 3B.

When the valves 344 are in the third state as shown in FIG. 3C, the second stream may be formed by a first air flow as provided directly by the fan 302 and a second air flow as provided by the fan 304. In other words, in FIG. 3C the second stream may be formed based on a partial conditioning/processing provided by the fan 304. Similar to FIG. 3B, in FIG. 3C at least a portion of the air flow that forms the third stream may be based on the output taken directly from the fan 302 (e.g., not subjected to conditioning/processing by the fan 304).

Figure 4:
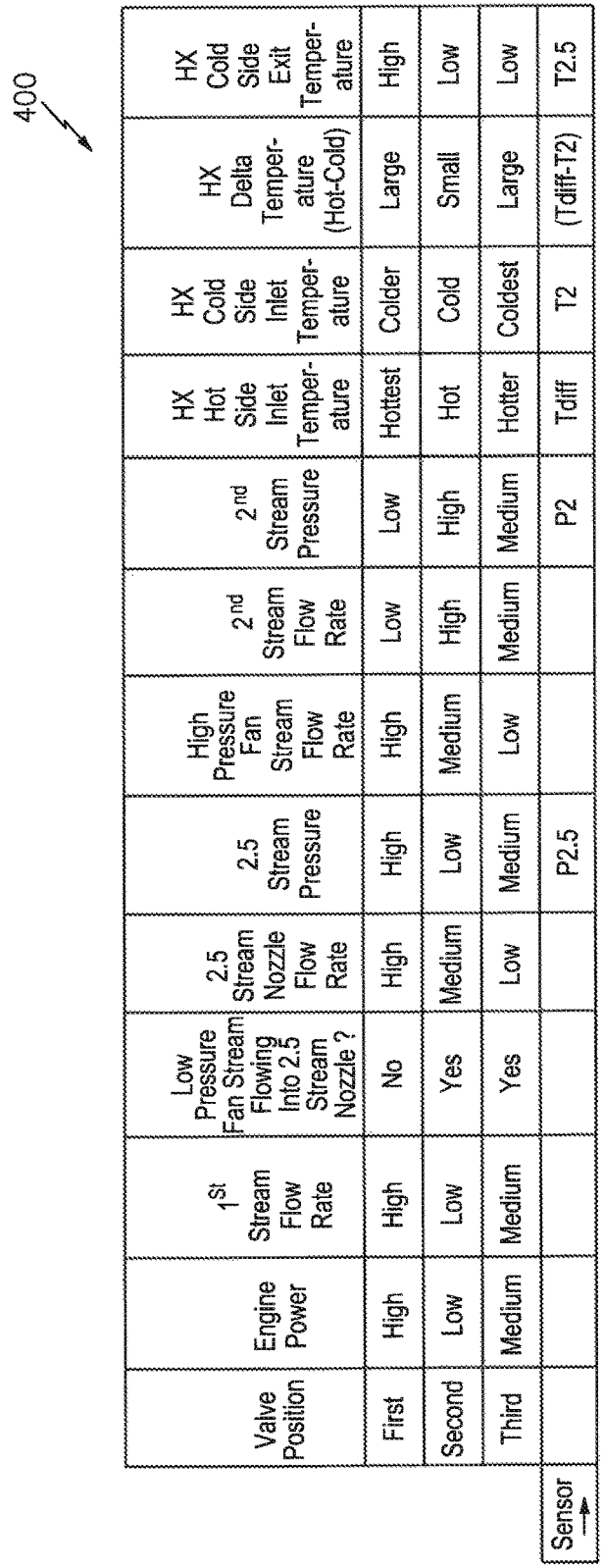
FIG. 4 illustrates a table of one or more parameters associated with the operation of an engine based on a state of at least one valve.

As described herein, the valves 244 and 344 may assume one of three positions, with FIG. 2A and FIG. 3A depicting a first position, FIG. 2B and FIG. 3B depicting a second position, and FIG. 2C and FIG. 3C depicting a third position. FIG. 4 provides a comparison (e.g., a qualitative comparison) between one or more parameters, such as for example engine power, flow rates, pressures, and temperatures, based on which of the three positions the valves 244 and 344 assume. In each column of FIG. 4, the status is relative within the column itself, as opposed to across the rows.

In view of FIG. 4, and as shown in FIGS. 2A and 3A, an engine may include one or more sensors (denoted as P2, T2, Tdiff, T2.5 and P2.5), Sensor P2 may measure the pressure associated with the second stream. Sensor T2 may measure the temperature associated with the second stream. Sensor Tdiff may measure the temperature associated with an output of a diffuser, which output may serve as an input to a heat exchanger (HX). Sensor T2.5 may measure a temperature associated with the third stream (e.g., the 2.5 "half" stream). Sensor P2.5 may measure a pressure associated with the third stream.

The outputs of the sensors described above may be analyzed by a controller (e.g., controller 272 of FIG. 2A or controller 372 of FIG. 3A) to determine a state/position for a valve (e.g., valve 244 or valve 344).

Figure 5:
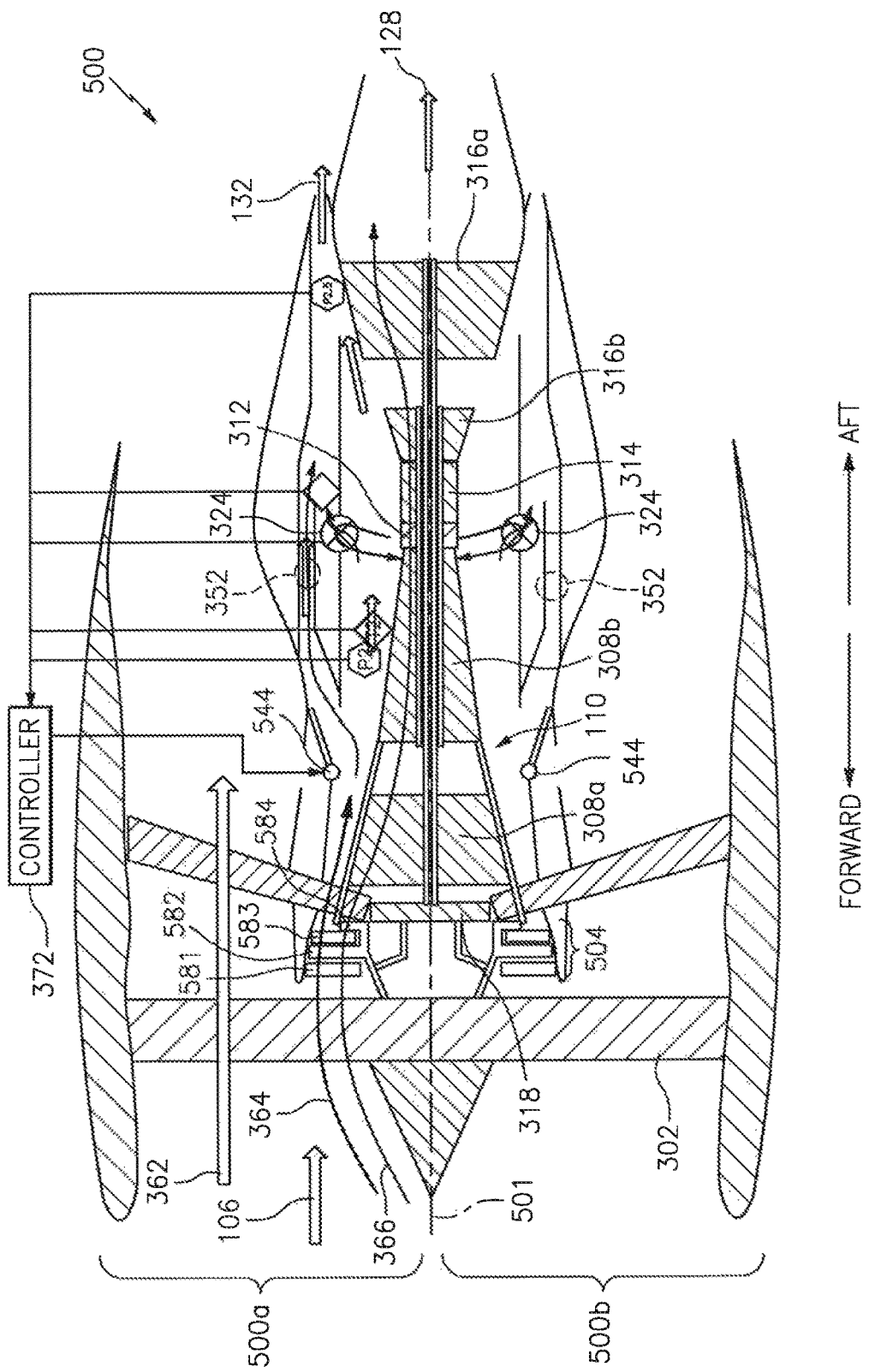
FIG. 5 illustrates an engine configured to generate a first, core stream and a second, bypass stream based on an output airflow of a second fan stage.

Referring now to FIG. 5, an engine 500 is shown. The engine 500 may be conceptualized as being substantially symmetrical about an axial centerline 501, such that the engine 500 may be conceptualized as having a first, top portion 500a above the centerline 501 and a second, bottom portion 500b below the centerline 501. The engine 500 includes many of the components/devices described above in connection with the engine 300, and so, a complete re-description is omitted for the sake of brevity.

The engine 500 is shown as including a second fan or fan stage 504. The fan 504 may be formed by or include one or more of a first set of vanes 581, a first set of blades 582, a second set of vanes 583, and a second set of blades 584.

The vanes 581 and blades 582 may form a first inducer stage. The vanes 583 and the blades 584 may form a second inducer stage.

The vanes 581 and 583 may be part of a core stator structure. The blades 582 and 584 may be part of one or more rotors.

One or more portions of the fan 504 (e.g., the blades 582 and/or the blades 584) may drive or contribute to the generation of the core flow 366 and/or the high pressure fan stream 364, where the high pressure fan stream 364 may contribute to one or both of the second stream or the third stream (again, labeled as 2.5 Half Stream in FIG. 5).

One skilled in the art would appreciate that, in FIG. 5, valves 544 are shown in a first state/position analogous to the depiction of the valve 344 in FIG. 3A. The valves 544 may assume second and third states/positions analogous to the depictions of the valves 344 in FIG. 3B and FIG. 3C, respectively.

As described herein, an air flow, or a portion of an air flow, may be used in generating/forming one or more streams. In this respect, a stream may be based on one or more air flows, or one or more portions of one or more air flows. Engine hardware (e.g., one or more fans, valves, cores, etc.) may condition/process the air flows, or portions of the air flows, in generating the streams.

Technical effects and benefits of this disclosure include an enhancement of the performance associated with an engine. For example, use of a three-state/position valve in an engine may minimize/reduce a pressure loss that would otherwise be associated with the engine if the engine incorporated a two-state/position valve.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. It is therefore to be understood that within the scope of the appended claims, the disclosure may be practiced other than as specifically described. For that reason the appended claims should be studied to determine true scope and content.

What is claimed is:

1. An engine defined about an axial centerline, comprising:
   a first fan configured to output a first air flow;
   a second fan configured to receive a first portion of the first air flow and output a second air flow;
   a core configured to receive a first portion of the second air flow and generate a first stream, the core including a combustor;
   at least one valve configured to assume one of at least three states in association with a generation of a second stream and a third stream based on at least one of the first air flow and the second air flow;
   a duct located radially outboard of the third stream; and
   a heat exchanger,
   wherein the first stream, the second stream, and the third stream are separate streams at an axial location that is aft of the combustor, and
   wherein the third stream is radially outboard of the second stream, and
   wherein the third stream is formed based on a portion of the second stream, and
   wherein the duct is configured to bypass a portion of the third stream in conveying a fourth stream, and
   wherein the third stream is based on an output of the heat exchanger, and
   wherein the at least one valve is located aft of the second fan and forward of the heat exchanger with respect to the axial centerline.

2. The engine of claim 1, wherein when the at least one valve is in a first of the at least three states the second stream and the third stream are generated based on a second portion of the second air flow.

3. The engine of claim 2, wherein when the at least one valve is in a second of the at least three states the second stream is generated based on the second portion of the second air flow and the third stream is generated based on a second portion of the first air flow.

4. The engine of claim 3, wherein when the at least one valve is in a third of the at least three states the second stream is generated based on a mixture of the second portion of the first air flow and the second portion of the second air flow, and wherein when the at least one valve is in the third of the at least three states the third stream is generated based on the second portion of the first air flow.

5. The engine of claim 3, wherein the second portion of the first air flow bypasses the second fan.

6. The engine of claim 1, wherein the first fan includes a plurality of stages, and wherein the core includes a turbine arranged as a plurality of sections, and wherein a first of the turbine sections is configured to drive the first fan, and wherein a second of the turbine sections is configured to drive the second fan.

7. The engine of claim 1, wherein the first fan is located forward of the second fan with respect to an inlet air flow received by the first fan, and wherein the second fan is located forward of the core with respect to the inlet air flow.

8. The engine of claim 1, further comprising:
a nozzle configured to output a mixture of the first stream and a portion of the second stream.

9. The engine of claim 1, further comprising:
at least one nozzle configured to output at least the third stream.

10. The engine of claim 1, wherein the duct is configured to convey a second portion of the second air flow when the at least one valve is in a first of the at least three states.

11. The engine of claim 10, wherein the duct is configured to convey a second portion of the first air flow when the at least one valve is in a second of the at least three states, and wherein the duct is configured to convey the second portion of the second air flow when the at least one valve is in a third of the at least three states.

12. The engine of claim 1, wherein the at least one valve includes a plurality of valves, and wherein a first of the valves is located at a first location and a second of the valves is located at a second location, and wherein the first and second locations coincide with a common axial location with respect to the axial centerline of the engine.

13. The engine of claim 1, further comprising:
a first nozzle configured to exhaust the first stream from the engine; and
a second nozzle configured to exhaust a mixture of a second portion of the second stream, the third stream, and the fourth stream from the engine.

14. The engine of claim 1, further comprising:
a first nozzle configured to exhaust a mixture of the first stream and a second portion of the second stream;
a second nozzle configured to exhaust the third stream; and
a third nozzle configured to exhaust a second portion of the first air flow.

15. The engine of claim 14, wherein the first nozzle is located radially inward of the second nozzle with respect to the axial centerline, and wherein the second nozzle is located radially inward of the third nozzle with respect to the axial centerline, and wherein the third nozzle is located forward of the second nozzle with respect to the axial centerline, and wherein the second nozzle is located forward of the first nozzle with respect to the axial centerline.

16. The engine of claim 1, wherein the heat exchanger interfaces with a mixture of the first air flow and the second air flow.

17. The engine of claim 1, further comprising:
a first case structure;
a second case structure located radially outward of the first case structure with respect to the axial centerline; and
a third case structure located radially outward of the second case structure with respect to the axial centerline;
wherein the first case structure forms a first flowpath for the first stream, and
wherein the first case structure and the second case structure form a second flowpath for the second stream, and
wherein the second case structure and the third case structure form a third flowpath for the third stream.

18. An engine defined about an axial centerline, comprising:
a first fan configured to output a first air flow;
a second fan configured to receive a first portion of the first air flow and output a second air flow;
a core configured to receive a first portion of the second air flow and generate a first stream, the core including a combustor;
at least one valve configured to assume one of at least three states in association with a generation of a second stream and a third stream;
a duct located radially outboard of the third stream; and
a heat exchanger,
wherein the second stream is based on a second portion of the second air flow, and
wherein the first stream, the second stream, and the third stream are separate streams at an axial location that is aft of the combustor, and
wherein the third stream is radially outboard of the second stream, and
wherein the third stream is formed based on a portion of the second stream, and
wherein the duct is configured to bypass a portion of the third stream in conveying a fourth stream, and
wherein the third stream is based on an output of the heat exchanger, and
wherein the at least one valve is located aft of the second fan and forward of the heat exchanger with respect to the axial centerline.

19. The engine of claim 18, wherein the second fan comprises a first inducer stage and a second inducer stage.

* * * * *